(12) United States Patent
Gabrielsson et al.

(10) Patent No.: US 9,479,048 B2
(45) Date of Patent: Oct. 25, 2016

(54) RESONANT ISOLATED ACTIVE POWER FACTOR CORRECTION (PFC) RECTIFIER

(71) Applicant: AeroVironment, Inc., Monrovia, CA (US)

(72) Inventors: Peter Erik Gabrielsson, Pasadena, CA (US); Nader Michael Lotfy, Pasadena, CA (US); Alexander Nelson Brooks, Pasadena, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 0 days.

(21) Appl. No.: 14/481,585

(22) Filed: Sep. 9, 2014

(65) Prior Publication Data

US 2015/0131337 A1 May 14, 2015

Related U.S. Application Data

(60) Provisional application No. 61/875,606, filed on Sep. 9, 2013.

(51) Int. Cl.
*H02M 1/42* (2007.01)
*H02M 3/335* (2006.01)

(52) U.S. Cl.
CPC ....... *H02M 1/4241* (2013.01); *H02M 3/33507* (2013.01); *Y02B 70/126* (2013.01)

(58) Field of Classification Search
CPC ......... H02M 1/4241; H02M 3/33507; H02M 1/42; H02M 7/02; Y02B 70/126
USPC ...... 363/21.02, 21.03, 47; 323/19, 324, 342, 323/359
See application file for complete search history.

(56) References Cited

U.S. PATENT DOCUMENTS

| 5,343,140 | A | 8/1994 | Gegner |
| 6,208,529 | B1 | 3/2001 | Davidson |
| 6,359,794 | B1 * | 3/2002 | Real ............................... 363/17 |
| 7,848,118 | B2 * | 12/2010 | Shimada ........... H02M 3/33584 363/127 |
| 2006/0062032 | A1 | 3/2006 | Soldano |
| 2007/0279508 | A1 * | 12/2007 | Fowler .......................... 348/311 |
| 2009/0154200 | A1 * | 6/2009 | Coccia ................ H02M 3/3376 363/21.02 |
| 2009/0231887 | A1 * | 9/2009 | Ye et al. ..................... 363/21.02 |
| 2011/0292703 | A1 * | 12/2011 | Cuk .............................. 363/126 |
| 2011/0317450 | A1 * | 12/2011 | Cheng ................. H02M 1/4241 363/20 |
| 2012/0019316 | A1 * | 1/2012 | Hattersley et al. ............ 327/581 |
| 2012/0126777 | A1 * | 5/2012 | Motegi ............... H02M 3/1582 323/311 |
| 2013/0107582 | A1 * | 5/2013 | Sato ........................... 363/21.06 |
| 2015/0015197 | A1 * | 1/2015 | Mi et al. ....................... 320/108 |

OTHER PUBLICATIONS

International Search Report for Serial No. PCT/US2014/054808 mailed Dec. 24, 2014.

\* cited by examiner

*Primary Examiner* — Jessica Han
*Assistant Examiner* — Demetries A Gibson
(74) *Attorney, Agent, or Firm* — Brooks Acordia IP Law, P.C.; Eric Aagaard

(57) ABSTRACT

A method of driving an isolated converter includes opening a first bi-directional switch on an input side of a transformer, accepting current into a resonant capacitor connected across the first bi-directional switch to reduce voltage across the first bi-directional switch in response to said opening the first bi-directional switch, reversing current out of the resonant capacitor, and closing the first bi-directional switch as voltage across the first bi-directional switch is approximately zero volts.

10 Claims, 6 Drawing Sheets

RESONANT ISOLATED ACTIVE POWER FACTOR CORRECTION (PFC) RECTIFIER

CROSS-REFERENCE TO RELATED APPLICATIONS

This application claims the benefit of priority to U.S. Provisional patent application No. 61/875,606 filed Sep. 9, 2013, and is incorporated herein for all purposes.

BACKGROUND

1. Field of the Invention

The invention relates to voltage rectifier circuits, and more particularly to isolated voltage rectifier circuits.

2. Description of the Related Art

Electrical isolation between primary and secondary circuits may be required in some applications that also require either AC-DC or DC-DC power conversion. One solution is presented in U.S. patent application Ser. No. 12/802,122 filed May 29, 2010 entitled, "Single-Stage AC-to-DC Converter with Isolation and Power Factor Correction" (the "Cuk application"). FIG. 1 illustrates a bridgeless power factor correction (PFC) rectifier introduced in the Cuk application. In FIG. 1, a resonant tank circuit (defined by a combination of Cr1, Cr2, and Lr) used during an ON-time portion of the circuit cycle to achieve zero current switching of the secondary side rectifiers CR1 and CR2 906. However, the dominant source of loss in the Cuk Application is the switching losses caused by the main switch drain capacitance and leakage inductance of the primary transformer.

A need continues to exist to reduce switching losses and primary transformer power losses in isolated power converters.

SUMMARY

A method of driving an isolated converter is disclosed that includes opening a first bi-directional switch on an input side of a transformer, accepting current into a resonant capacitor connected across the first bi-directional switch to reduce voltage across the first bi-directional switch (SW) in response to the opening of the first bi-directional switch, reversing current out of the resonant capacitor and closing the first bi-directional switch as voltage across the first bi-directional switch is approximately zero volts. The method may also include inducing current to flow through a transformer, and rectifying alternating current (AC) output from the transformer to create direct current (DC). In one embodiment, the rectifying AC output to create DC current is accomplished using a full bridge rectifier connected across an output of the transformer. In another embodiment, current to a load, when a load is present, is supplied entirely by an output capacitor connected across the load when the first bi-direction switch is closed. The method may also include ramping up current in a first input resonant inductor in a first rotational current direction in response to the closing of the first bi-directional switch. In such an embodiment, the method may also include ramping up current in a second input resonant inductor in a second rotational current direction that is opposite from the first rotational current direction in response to the closing of the first bi-directional switch. Additionally, the method may include opening a second bi-directional switch connected in series with the first bi-directional switch at approximately the same time as the opening of the first bi-directional switch, and may include accepting current into a second resonant capacitor connected across the second bi-directional switch in response to the opening of the second bi-directional switch. In some embodiments, the closing of the first bi-directional switch is in response to a positive gate voltage applied to the first bi-directional switch. The method may also include shorting the resonant capacitor in response to closing the first bi-directional switch.

An isolated converter is also disclosed that includes a first resonant tank circuit having a resonant inductor connected in series between a first direct current (DC) blocking capacitor and a transformer on an input side of the transformer, and having a second DC blocking capacitor connected to an output side of the transformer and a second resonant tank circuit having the resonant inductor connected in series between the transformer and a first resonant capacitor. The isolated converter may also include a first switch connected across the first resonant capacitor. The isolated converter may also include a second switch connected in series with the first switch and a second resonant capacitor connected across the second switch, so that the first and second resonant capacitors create a capacitive voltage divider that is configured to provide equal voltage across the first and second switches. In some embodiments, the isolated converter also includes a full bridge rectifier connected across the output side of the transformer, and may include an output capacitor connected across an output of the full bridge rectifier. In further embodiments, the isolated converter may include an input inductor connected to the first switch and first resonant capacitor. The first DC blocking capacitor may be connected between the resonant inductor and the first resonant capacitor, and a second input inductor may be connected to the second switch and second resonant capacitor.

An isolated converter is also disclosed that includes a first switch, a first resonant capacitor connected across the first switch, a first resonant inductor connected to the first switch and the first resonant capacitor, and a transformer connected to the first resonant inductor. The isolated converter may also include a second switch connected in series with the first switch, a second resonant capacitor connected across the first switch, and with the transformer connected to the second switch and second resonant capacitor. The isolated converter may also include a voltage rectifying circuit coupled to an output of the transformer. In one embodiment, the voltage rectifying circuit may be a full bridge rectifier, and an output capacitor may be connected across an output of the rectifying circuit. In another embodiment, the first switch comprises a reverse blocking metal-oxide semiconductor field-effect transistor (MOSFET) switch.

BRIEF DESCRIPTION OF THE DRAWINGS

The components in the figures are not necessarily to scale, emphasis instead being placed upon illustrating the principals of the invention. Like reference numerals designate corresponding parts throughout the different views.

DETAILED DESCRIPTION

An isolated power converter topology is disclosed that is operable to reduce switching losses and primary transformer power losses in either AC-DC or DC-DC operation versus conventional converter systems. By connecting a resonant capacitor across a bi-directional switch and with the addition of a second resonant tank circuit, the topology is operable to provide zero voltage switching (ZVS) across the switch to reduce power losses previously experienced at the switch in other topologies. In embodiments that use a full bridge rectifier on the output, full use is also made of the transformer, resulting in additional power savings versus prior topologies. The system is scalable to enable higher voltage operation using lower voltage switches by providing additional bi-directional switches in series, with associated resonant capacitors connected across them providing respective capacitive voltage dividers to reduce the voltage across any individual switch in the system.

Figure 1:
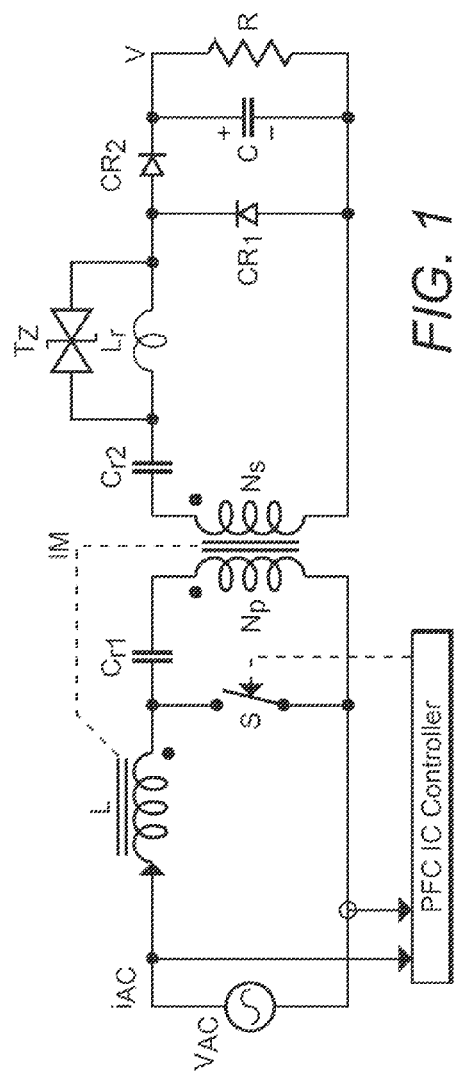
FIG. 1 is a prior art schematic of a resonant isolated active PFC rectifier.
Figure 2:
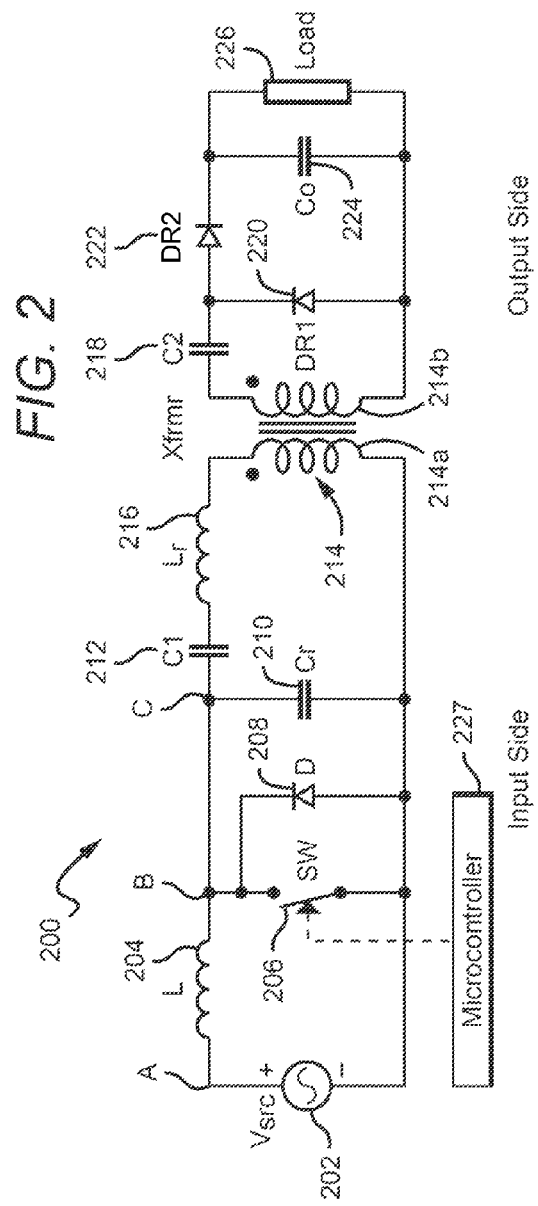
FIG. 2 is a schematic diagram of one embodiment of a resonant isolated active PFC rectifier having a resonant capacitor connected across a switch and forming a tank circuit with a resonant inductor.

FIG. 2 is a schematic diagram of one embodiment of a resonant isolated active PFC rectifier ("converter") having a resonant capacitor across a switch to create a resonant tank circuit with a resonant inductor Lr. On an input side of the converter 200, a voltage source 202 is connected to an inductor L 204 at an input A. A bi-directional switch SW 206 (preferably high voltage rated), in the case of AD-DC operation, may be connected across the inductor L 204 and the voltage source Vsrc 202, with the bi-directional high voltage switch SW 206 preferably consisting of back-to-back field effect transistors (FETs) or two N-channel MOSFETs back-to-back, or may be constructed from any type of transistor as long as reverse blocking can be achieved. A freewheeling diode D 208 is illustrated as connected across the bi-directional switch SW 206, although if the bi-directional switch SW 206 consists of back-to-back FETS, or a reverse blocking metal-oxide semiconductor field-effect transistor (MOSFET) switch, then the freewheeling diode may already be apart of the FET configuration and so may be omitted. A resonant capacitor Cr 210 may be coupled in parallel with the diode 208 and switch SW 206 to store energy for reduction of the frequency and amplitude of a circuit voltage spike that is induced by the inductor at node B as the switch SW 206 is turned on. The resonant capacitor Cr 210, in combination with Lr 216, may enable zero-voltage switching (ZVS) of the switch SW 206 as the switch is turned off to reduce switching losses from what would otherwise exist without ZVS.

A DC blocking capacitor (high-pass) C1 212 is connected to the resonant capacitor Cr 210 and inductor L 204 at node C to prevent the transformer Xfrmr 214 from experiencing a DC component of the voltage supplied by the voltage source Vsrc 202 to reduce the possibility of saturation of the transformer Xfrmr 214. A resonant inductor Lr 216 is connected in series between the DC blocking capacitor C1 212 and transformer 214. The resonant inductor Lr 216, DC blocking capacitor C1 212 and resonant capacitor Cr 210 may form a tank circuit (referred to as a second resonant tank circuit (T2)) through the transformer Xfrmr 214, although the DC blocking capacitor C1 is preferably sized large enough to have insubstantial effect on the resonant frequency of the circuit T2.

On an output side of the converter 200, a second DC blocking capacitor C2 218 is connected to a rectifying circuit formed by freewheeling output rectifier diodes DR1 220 and DR2 222. An output capacitor Co 224 is illustrated as connected across an output of the rectifying circuit (DR1 220 and DR2 222) and across a Load 226 to filter out ripple noise caused by rectifier internal switching and to provide steady current to the Load 226 as power is provided to the load in discrete increments. The blocking capacitor C1 and resonant inductor (Lr) on the primary (i.e., input) side of the transformer Xfrmr, and the blocking capacitor C2 on the secondary (i.e., output) side of the transformer Xfrmr, collectively define another tank circuit (referred to as a first tank circuit (T1)) through the transformer Xfrmr 214.

The converter 200 operation consists of two modes: switch SW on period (on-state) and switch SW off period (off-state). The off period is dictated by the resonant timing of the second tank circuit T2 and remains largely constant. The on period is adjustable to regulate power; the transfer function is thus a function of 1/F, specifically:

$$\frac{V_{out}}{V_{in}} = \frac{C_{conv}}{t_{off} F_{sw}} \quad (1)$$

In an AC-DC application of converter 200, the voltage source Vsrc 200 provides alternating current (AC), although the switching frequency for the switch SW may be several orders of magnitude higher than the input frequency and so may be treated as a DC input, as described further, below. In an isolated DC-DC embodiment of converter 200, the voltage source Vsrc 200 may provide direct current (DC), and input A provided with either positive or negative voltage. In such an embodiment, the bi-directional switch SW 206 may be a unidirectional switch. Also, if capability were desired for either positive or negative DC input voltages, a bi-directional switch would be used.

During operation and starting with a description of the on-state of the converter 200, the resonant capacitor Cr 210 is in a discharged condition and the switch SW 206 turned "on" (i.e., closed). The input current starts to ramp up through the inductor L 204 to an average input current equal to Vin*Ton/2L, where L is the value of the input inductor L, similar to how a typical boost converter operates. The first DC blocking capacitor C1 212 begins to discharge through the switch SW 206, the primary winding 214a of the transformer Xfrmr 214 and through the resonant inductor Lr 216 (i.e., through the second tank circuit T2). In response to current through the primary winding 214a, current is induced through the secondary winding 214b of the transformer Xfrmr 214 and flows through the rectifier diode DR1 220 and second DC blocking capacitor C2 218. The output capacitor Co 224 also begins to supply power through the Load 226, with the Load being supplied entirely from the output capacitor Co 224. The rectifier diode DR2 222 does not experience substantive current flow because it is experiencing a negative voltage across it during the on-state.

As the on-state of the converter 200 transitions to the off-state, preferably as input current through the input inductor L 204 reaches the desired power level for the converter 200 and a microcontroller 227 induces switch SW 206 to open, the resonant capacitor Cr 210 rapidly begins to accept current pushed from the inductor L 204. With the resonant capacitor Cr 210 preferably sized appropriately to keep the voltage across the now-opened switch SW 206 at zero volts as it opens, the voltage across Cr 210 doesn't change very fast (i.e., on the order of microseconds) and keeps the voltage across it low. Current is also pushed by the inductor L 204 through the primary winding 214a of the transformer 214. As the inductor L 204 continues to charge the resonant capacitor Cr 210, the voltage across the resonant capacitor Cr 210 and switch SW 206 begins to rise in a sinusoidal relationship until it rises above the voltage of the DC blocking capacitor C1 212, thereby inducing a reversal in the direction of current flow so that a clockwise current begins to flow through the resonant inductor Lr 216 and the DC blocking capacitor C1 212 and through the primary winding 214a of the Xfrmr 214 (the second Tank circuit (T2)). Current is also thereby induced through the secondary winding 214b of the Xfrmr 214 for clockwise flow through the second blocking capacitor C2 218 and rectifying diode DR2 to charge the output capacitor Co 224 and to provide current to the Load 226. The first blocking capacitor C1 212 becomes recharged during this off-state. Rectifying diode DR1 is open and not part of the circuit in the off-state of the converter 200. As more and more current from the input resonator L 204 starts flowing through the primary winding 214a of the transformer Xfrmr 214, the resonant capacitor Cr 210 begins to discharge and the voltage across the resonant capacitor Cr 210 drops again. The frequency (w) of the voltage of the second resonant tank circuit (T2) is generally sinusoidal and is a function of the resonant capacitor Cr and inductor Lr (210, 216) values, as described more fully, below. Eventually the voltage across the resonant capacitor Cr 210 crosses approximately zero volts, as measured or calculated, and the switch SW 206 is activated again by the microcontroller (not shown) to close. For optimum efficiency, the exact moment to turn on the switch SW 206 should be controlled to coincide with the zero crossing of the voltage across the switch SW 206. If the switch SW 206 is turned on too early, the energy in the resonant capacitor Cr 210 gets dumped into the switch SW 206 causing losses. If the switch SW 206 is turned on too late, the intrinsic diode of the switch may start to conduct and charge the output capacitance of the switch SW 206 which will then be drained at turn-on causing losses. The time of the zero crossing is a function of current, voltage and temperature. Using a DSP for control, the moment of zero crossing may be determined mathematically as understood by one of ordinary skill in the art (i.e., using calculated time). Further improvements may be found by measuring the input and output power and using an algorithm similar to maximum power point tracking (MPPT) to find the optimum time to turn the switch SW 206 on (i.e., using measured time).

Figure 3:
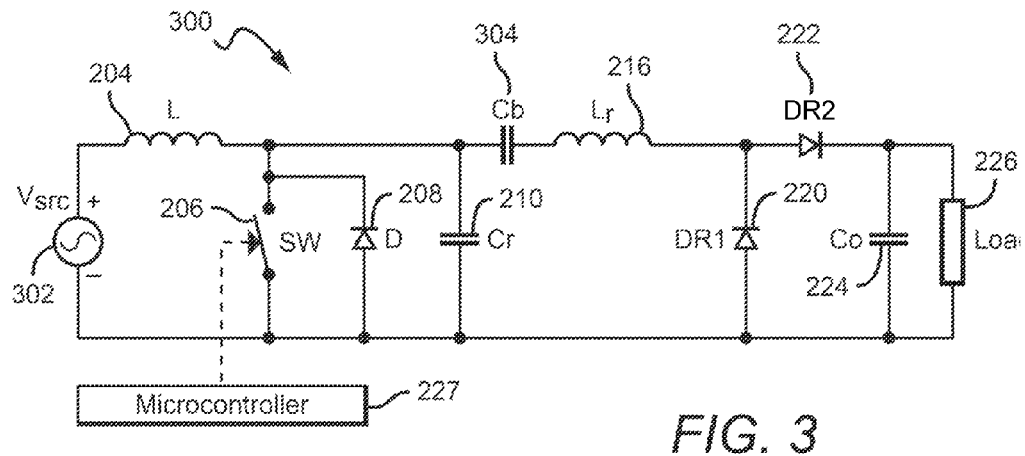
FIG. 3 is a simplified schematic of the converter 200 illustrated in FIG. 2 for purposes of circuit analysis.

FIG. 3 is a simplified schematic of the converter 200 illustrated in FIG. 2 that ignores the transformer Xfrmr 214 for analysis purposes. For purposes of analysis, an AC voltage source 302 may be considered a DC voltage source since the switching frequency of the switch SW 206 is several orders of magnitude higher than the input frequency of the voltage source 302. The circuit representation 300 of converter 200 in FIG. 2 may be simplified and discussed as a non-isolated converter by replacing the transformer Xfrmr 214 (see FIG. 2) with a magnetizing inductor (not shown), which is large in value and so can be ignored for purposes of analysis. Leakage inductance of the transformer Xfrmr 214 (see FIG. 2) is small compared to the inductance value of the resonant inductor Lr 216 and so may also be ignored for analysis purposes. The DC blocking capacitors C1 and C2 (212, 218)(see FIG. 2) on the primary and secondary sides of the transformer Xfrmr, respectively, may be combined for analysis purposes into one equivalent blocking capacitor Cb 304 connected in series to inductor L 204 and connected to freewheeling diode 208 and the resonant capacitor Cr 210. The equivalent blocking capacitor Cb is sized to remove the DC offset from the transformer during the switching periods and is large. The output capacitor Co 224 is connected across the Load 226 and across the rectifying diodes DR1 and DR2 (220, 222). The bottom rectifying diode DR1 220 is held in on-state during positive input voltage and may be ignored for analysis purposes. Determination of component values of the inductor L 204, the blocking capacitors (C1, C2) and the output capacitor (CO) and transformer Xfrmr 214 ratio (see FIG. 2) may be found in the Cuk application and such is incorporated by reference into this description.

The frequency (ω) of the voltage of the second resonant tank circuit (T2), may be expressed as (2):

$$\omega = \left| 0.5 \cdot \sqrt{\left(\frac{R}{L_r}\right)^2 - \frac{4}{L_r \cdot C_r}} \right| \quad (2)$$

In one embodiment designed for 240 VAC input and 48V DC output and intended to maintain zero-voltage switching (ZVS) across the switch SW 206, the components in FIG. 3 may have the values described in Table 1.

TABLE 1

| | |
|---|---|
| L | 100 uH-500 uH |
| Cb | 1 uF-10 uF |
| Lr | 10 uH-50 uH |
| Cr | 10 nF-50 nF |
| Co | 10 uF-100 uF |

Figure 4:
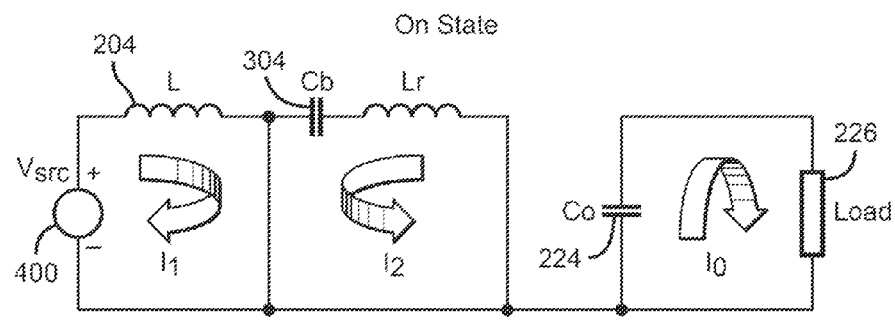
FIG. 4 is an equivalent circuit schematic of the simplified circuit 300 of converter 200 during an on-state for a positive input voltage.
Figure 5:
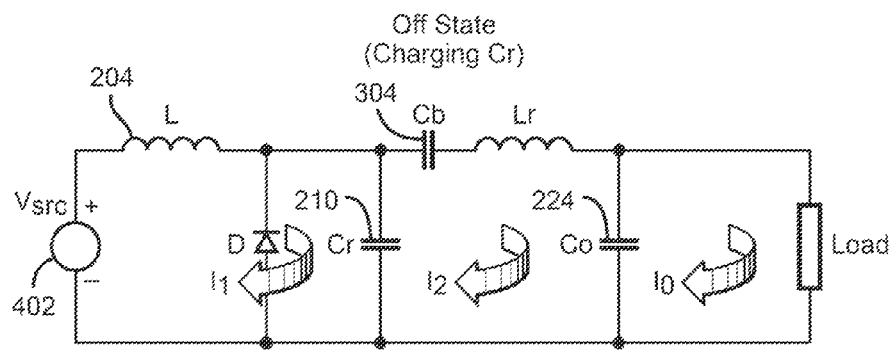
FIG. 5 is an equivalent circuit schematic of the simplified circuit 300 of converter 200 during an off-state for a positive input voltage.
Figure 6:
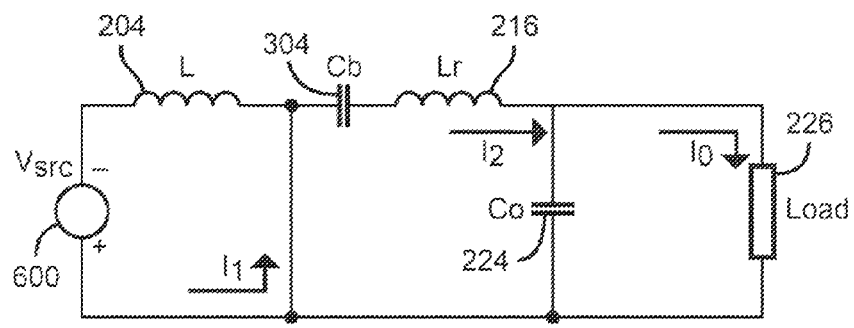
FIG. 6 is an equivalent circuit schematic of the simplified circuit 300 of converter 200 during an on-state for a negative input voltage.
Figure 7:
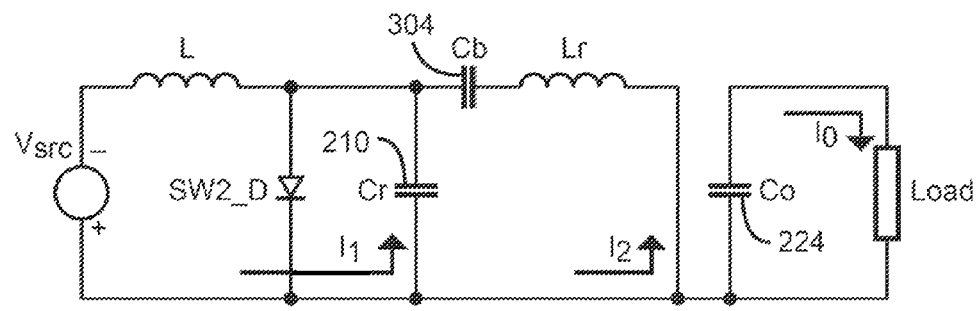
FIG. 7 is an equivalent circuit schematic of the simplified circuit 300 of converter 200 during an off-state for a negative input voltage.

With the simplified rectifier circuit 300 of FIG. 3, the on-state and off-state current flow may be described by the equivalent schematics of FIGS. 4 and 5, respectively, for a positive applied voltage, and by FIGS. 6 and 7, respectively, for a negative applied voltage.

FIG. 4 is an equivalent circuit schematic of the simplified circuit 300 (see FIG. 3) of converter 200 (see FIG. 2) during an on-state for a positive input voltage. As the on-state begins, a positive input voltage 400 is presented across the input inductor L 204 and current $I_1$ ramps up quickly. A voltage across the equivalent blocking capacitor Cb 304 ramps up the current $I_2$ in a counterclockwise direction and results in a slight discharge of equivalent capacitor Cb 304. The freewheeling diode DR1 220 (see FIG. 3) turns on, and DR2 222 (see FIG. 3) turns off, resulting in the Load current $I_0$ being supplied entirely from the output capacitor Co 224 in a clockwise direction.

FIG. 5 is an equivalent circuit schematic of the simplified circuit 300 (see FIG. 3) of the converter 200 (see FIG. 2) during an off-state for a positive input voltage 402 provided by the voltage source Vsrc. Current $I_1$ starts charging up the resonant capacitor Cr 210. With the voltage across the resonant capacitor Cr 210 rising above the voltage of the equivalent blocking capacitor Cb 304 and output capacitor Co 224, the current $I_2$ is induced to change direction and start flowing in a clockwise direction so that the Load 226 is powered by current $I_2$ and $I_0$. Finally, the equivalent blocking capacitor Cb 304 is recharged.

FIG. 6 is an equivalent circuit schematic of the simplified circuit 300 (see FIG. 3) of the converter 200 (see FIG. 2) during an on-state for a negative input voltage. As the on-state begins, a negative input voltage 600 is presented across the input inductor L 204 and current $I_1$ ramps up. A voltage across the equivalent blocking capacitor Cb 304 ramps up the current $I_2$ in a clockwise direction through the resonant inductor 216 with a resulting slight discharge of capacitor Cb 304. The freewheeling diode DR1 220 (see FIG. 3) turns off and DR2 222 (see FIG. 3) turns on resulting in the Load 226 current $I_0$ being supplied from I2 which is also recharging the output capacitor CO.

FIG. 7 is an equivalent circuit schematic of the simplified circuit 300 (see FIG. 3) of converter 200 (see FIG. 2) during an off-state for a negative input voltage. Current I1 starts charging up the resonant capacitor Cr 210. With the voltage across the resonant capacitor Cr 210 rising above the voltage across the equivalent blocking capacitor Cb 304 and output capacitor Co 224, the current I2 is induced to change direction and start flowing in a counterclockwise direction. The freewheeling diode DR1 turns on and diode DR2 turns off so that the Load 226 is powered by the output capacitor Co 224 current $I_0$. Finally, the equivalent blocking capacitor Cb 304 is recharged.

Figure 8:
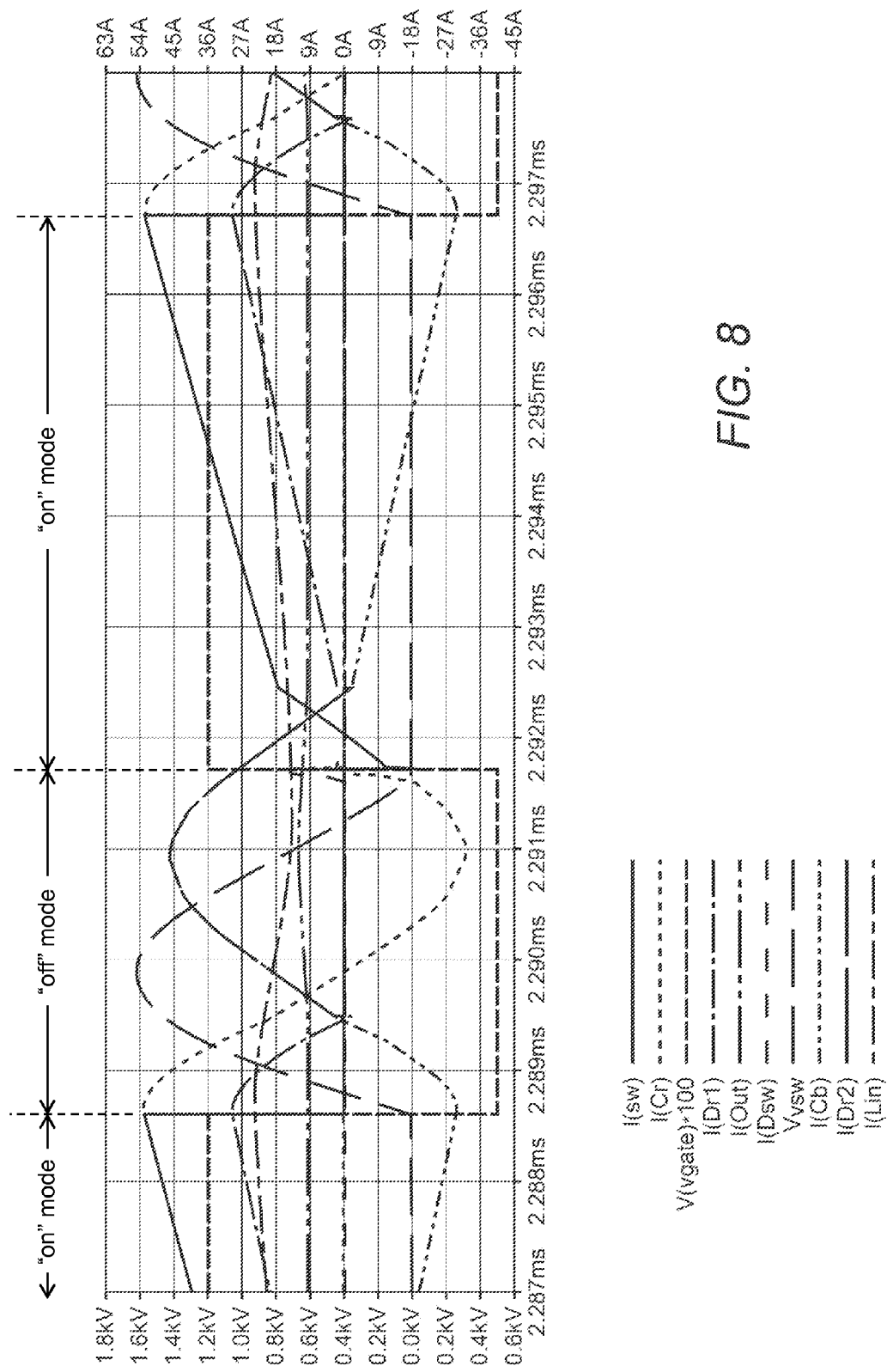
FIG. 8 is a graph showing one embodiment of voltage and current versus time across (and through) the various components illustrated in FIG. 3.

FIG. 8 is a graph showing voltage and current versus time across (and through) the various components illustrated in FIG. 3, with the gate voltage V(vgate) representing the command voltage for activation of the switch SW. During the "on" mode with the gate voltage V(vgate) high, the switch SW turns on (i.e., "closed" condition) and current through each of the inductor L I(Lin), switch SW I(Sw) and the freewheeling diode DR1 I(Dr1) ramp up. Current through the resonant capacitor I(Cr) is zero, as it is shorted by the closed switch SW 206. Also, there is no current illustrated as flowing through output rectifier diode DR2 (I(DR2)).

During the "off" mode in the next time interval as the gate voltage V(vgate) turns off to turn off the switch SW (i.e., a switch "open" condition), current I(Cr) ramps up very quickly to accept current pushed from the input inductor L to keep the input current largely constant during the switching period and to allow a zero voltage switching (ZVS) condition for reduced power loss during switching. Voltage V(vsw) across the switch SW starts to ramp up and current I(Lin) in the input inductor L starts to ramp down as the resonant capacitor (Cr) is charged. Voltage V(vsw) across the SW generally follows a sine wave, starting at 0V immediately prior to switch closing, peaking as the current I(Cr) passes from positive to negative current. Current through the output rectifier diode I(Dr2) ramps up as the transformer drives current through it, and the freewheeling diode current I(Dr1) is zero. The voltage V(vsw) across the switch again approaches 0V as the resonant current I(Cr) becomes negative. As illustrated in FIG. 8, the resonant capacitor Cr becomes fully discharged a short period of time before activating the switch SW, with current I(D) in the freewheeling diode D across the switch SW momentarily spiking before the next time interval. The "on" mode is begun again by driving the gate voltage V(vgate) back to high to again turn on the switch SW (i.e., a switch "closed" condition). Current I(Sw) through the switch ramps up very quickly, with the current I(Lin) in input inductor Lin slowly ramping up as the blocking capacitor Cb is charged with a slow ramp of current I(Cb). Current I(Dr2) in the freewheeling diode DR2 goes to zero and current I(Dr1) in the freewheeling diode DR1 ramps up. During each of the first time interval with the SW driven closed, during the second time interval with the SW open, and during the third interval when the switch SW is again driven closed, the output current I(Out) remains substantially flat at, in this embodiment, approximately 9 A.

The zero voltage switching and resonant capacitor topology allows for construction of a high voltage switch by connecting several lower voltage switches in series with resonant capacitors distributed across them. The resonant capacitors will ensure that the voltage distributes evenly across the switches. One example embodiment having two lower voltage switches in series with resonant capacitors to enable higher-voltage operation than would be possible with only one switch is described by way of FIG. 9, below.

Figure 9:
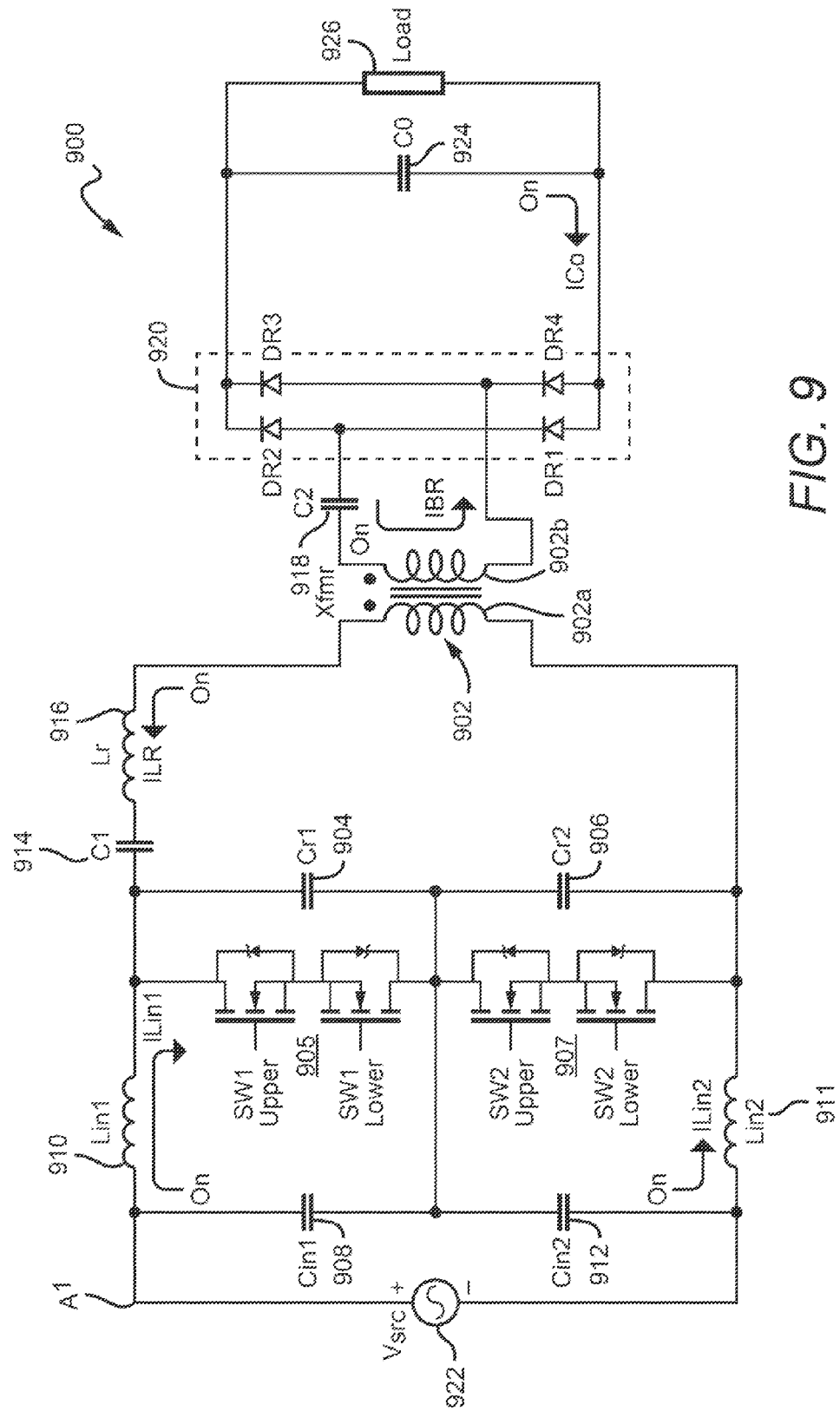
FIG. 9 is a schematic diagram of another embodiment of a resonant isolated active PFC rectifier having two resonant capacitors connected across two switches for enhanced high voltage capability versus the rectifier illustrated in FIG. 2.

FIG. 9 is a schematic diagram illustrating the use of multiple switches and resonant capacitors for enhanced high voltage capability in a converter 900. By using a plurality of resonant capacitors connected in series, a capacitive voltage divider is created reducing the voltage experienced across any one associated switch, thereby allowing the use of less expensive, more compact and less voltage-capable switches that collectively switch the input voltage presented to the converter 900. In the embodiment illustrated in FIG. 9, a first resonant capacitor Cr1 904 is connected on an input side of the transformer Xfmr 902 across a first high-power switch SW1 905 that may include two back-to-back transistors (SW1 Upper, SW1 Lower) with respective freewheeling diodes, such as a reverse blocking MOSFET switch, to provide conduction and voltage hold off in both current directions. Similarly, a second resonant capacitor Cr2 906 is connected across a second high-power switch SW2 907 that may also have back-to-back transistors (SW2 Upper, SW2 Lower) having respective freewheeling diodes, such as another reverse blocking MOSFET switch. The two resonant capacitors (Cr1 904, Cr2 906) effectively create a capacitive voltage divider to provide equal voltage across the switches (SW1 905, SW2 907).

A first input capacitor Cin1 908 is connected in series with a first input inductor Lin1 910 that are collectively connected across the first switch SW1 905, and a second input capacitor Cin2 912 is coupled in series with a second input inductor (Lin2) 911 that are collectively connected across the second switch SW2 907. Cin1 908 and Cin2 912 stabilize the mid-voltage for both switches so that the top and bottom switches (SW1 905, SW2 907) experience equal voltage. A voltage source is connected between the input inductor Lin1 910 and the second input inductor (Lin2) 911. The Vsrc 202 may be either an AC or a DC voltage source, with input A' provided with either positive or negative voltage.

A first DC blocking capacitor C1 914 and resonant inductor Lr 916 are connected in series between a transformer Xfmr 902 and the first resonant capacitor Cr1 904. The resonant inductor Lr 916, DC blocking capacitor C1 914 and two resonant capacitors (Cr1 904, Cr2 906) may form a tank circuit, referred to herein as a second resonant tank circuit (T2) for FIG. 9 (analogous to the second resonant tank circuit T2 described for FIG. 2) through the transformer Xfmr 902. The DC blocking capacitor C1 914 may be ignored for analysis purposes, as it is preferably sized large enough to have insubstantial effect on the resonant frequency of the tank circuit.

On the output side of the Xfrmr 902, a second DC blocking capacitor C2 918 is connected to the transformer Xfrmr 902 to prevent the transformer Xfrmr 902 from experiencing a DC component of the voltage supplied by a voltage source Vsrc 922 to reduce the possibility of saturation of the transformer Xfrmr 902. To make better use of the transformer Xfmr 902 (doubling utilization of the transformer over use of the DR1 and DR2 rectifying diodes illustrated in FIG. 2), a rectifying circuit in the form of a full bridge output rectifier 920 may be connected across the transformer 902, with an output capacitor CO 924 connected across an output of the full bridge rectifier. A load 926 may be connected across the output capacitor CO 924. The blocking capacitor C1 914 and resonant inductor Lr 916 on the primary side of the transformer Xfrmr 902, and the blocking capacitor C2 918 on the secondary side of the transformer Xfrmr 902, collectively define another tank circuit through the transformer Xfrmr (referred to as a first resonant tank circuit (T1) for FIG. 9).

During operation, the switches (SW1 905, SW2 907) may each be controlled by the same gate signal to open and close at approximately the same time. In one embodiment, only one transistor in each switch (SW1 905, SW2 907) is modulated, while keeping the opposing transistor fully on, to clamp the voltage across the switching element to zero volts and to prevent it from going negative. The illustrated freewheeling diodes in each of the switches (SW1 905, SW2 907) are not strictly necessary if turn-on always occurs at the zero crossing of the voltage; however, they do help to reduce the losses if switch turn-on occurs after the zero voltage crossing.

Turning first to describe one embodiment of operation the converter 900 during the "on" mode, SW1 905 and SW2 907 are driven to close, and current $I_{LIN1}$ and $I_{LIN2}$ (illustrating the on-state (only) in FIG. 9) ramp up through input inductors Lin1 910 and Lin2 911, respectively, although in opposite directions due to the opposite voltages across them. Voltage across the two resonant capacitors (Cr1 904, Cr2 906) is zero due to the switches (SW1 905, SW2 907) being closed. Current $I_{LR}$ (illustrating the on-state (only) in FIG. 9) flows counterclockwise through the resonant inductor Lr 916 and the primary winding 902A of the transformer Xfmr 902. The first DC blocking capacitor C1 914 begins to discharge through the first and second switches (SW 905, SW907), the primary winding 902A of the transformer Xfrmr 902 and through the resonant inductor Lr 916 (i.e., through the second tank circuit T2). In response to current driven through the primary winding 902a, current $I_{BR}$ is induced in a counterclockwise direction through a secondary winding 902b of the transformer Xfrmr 902 to flow through the full bridge rectifier 920 and through a second DC blocking capacitor C2 918. Current Ico flows clockwise through the output capacitor Co 924 and full bridge rectifier 920.

Turning to now describe one embodiment of operation during the "off" mode, the switches (SW1 905, SW2) are induced to open by a microcontroller (not shown), preferably as input current through the input inductor Lin1 910 reaches the desired power level for the converter 900. Current $I_{LIN1}$ and $I_{LIN2}$ start to flow through the two resonant capacitors (Cr1 904, Cr2 906) as current is pushed by the first and second input inductors (Lin1 910, Lin2 911), respectively, to momentarily maintain zero Volts across the switches (i.e., zero-volt switching) (SW1 905, SW2 907). Voltage across the resonant capacitors (Cr1 904, Cr2 906) starts to rise in a sinusoidal manner, causing a current to flow through the resonant inductor Lr 916 and primary winding 902A of the transformer Xfrmr 902 in a clockwise direction (opposite than that illustrated for $I_{LR}$ during the on-state) and back through the resonant capacitors (Cr1 904, Cr2 906). As the input inductors (Lin1 910, Lin2 911) continue to charge their respective resonant capacitors (Cr1 904, Cr2 906), the voltage across the resonant capacitors (Cr1 904, Cr2 906) and switches (SW1 905, SW2 907) begins to rise in a sinusoidal relationship until they collectively rise above the voltage of the DC blocking capacitor C1 914, thereby inducing a reversal in the direction of current flow so that a clockwise current begins to flow through the resonant inductor Lr 916 and the DC blocking capacitor C1 914 and through the primary winding 902a of the Xfrmr 902 (the second Tank circuit (T2)). Current is also thereby induced through the secondary winding 902b of the Xfrmr 902 for clockwise flow through the second blocking capacitor C2 918 and full bridge rectifier 920 to charge the output capacitor Co 924 and to provide current to the Load 926. The first blocking capacitor C1 918 becomes recharged during this off-state. As more and more current from the input resonators (Lin1 910, Lin2 911) starts flowing through primary winding 902A of the transformer Xfrmr 902, the resonant capacitors (Cr1 904, Cr2 906) begins to discharge and the voltage across the resonant capacitors (Cr1 904, Cr2 906) drops again. Eventually the voltage across the resonant capacitors (Cr1 904, Cr2 906) approaches and crosses zero volts again, as measured or calculated, and the switches (SW1 905, SW2 907) are activated again by the microcontroller (not shown) to close. For optimum efficiency, the exact moment to turn on the switches (SW1 905, SW2 907) should be controlled to coincide with the zero crossing of the voltage across the switches (SW1 905, SW2 907). Similar to that described above for FIG. 2, if the switches (SW1 905, SW2 907) are turned on too early, the energy in the resonant capacitors (Cr1 904, Cr2 906) gets dumped into the switches (SW1 905, SW2 907) causing losses. If the switches (SW1 905, SW2 907) are turned on too late, further loses will be experienced. Using a DSP for control (not shown), the moment of zero crossing can be determined mathematically as understood by one of ordinary skill in the art (i.e., using calculated time). Further improvements can be had by measuring the input and output power and using an algorithm similar to maximum power point tracking (MPPT) to find the optimum time to turn the switch SW on (i.e., using measured time).

In one implementation using silicon carbide MOSFET switches (SW1 905, SW2), the voltage source Vsrc may provide 480V AC at 60 Hz, with each switch (SW1 905, SW2) seeing approximately 1000 V across it (i.e., 2000 V AC across both). Switches SW1 905 and SW2 907 may be switched from ON to OFF or from OFF to ON every 3.0 ms to accomplish zero-voltage switching (ZVS). However, if higher input voltages are desired, additional switches and associated resonant capacitors connected across them, would be utilized to enable reduced individual voltages across the respective switches.

Figure 10:
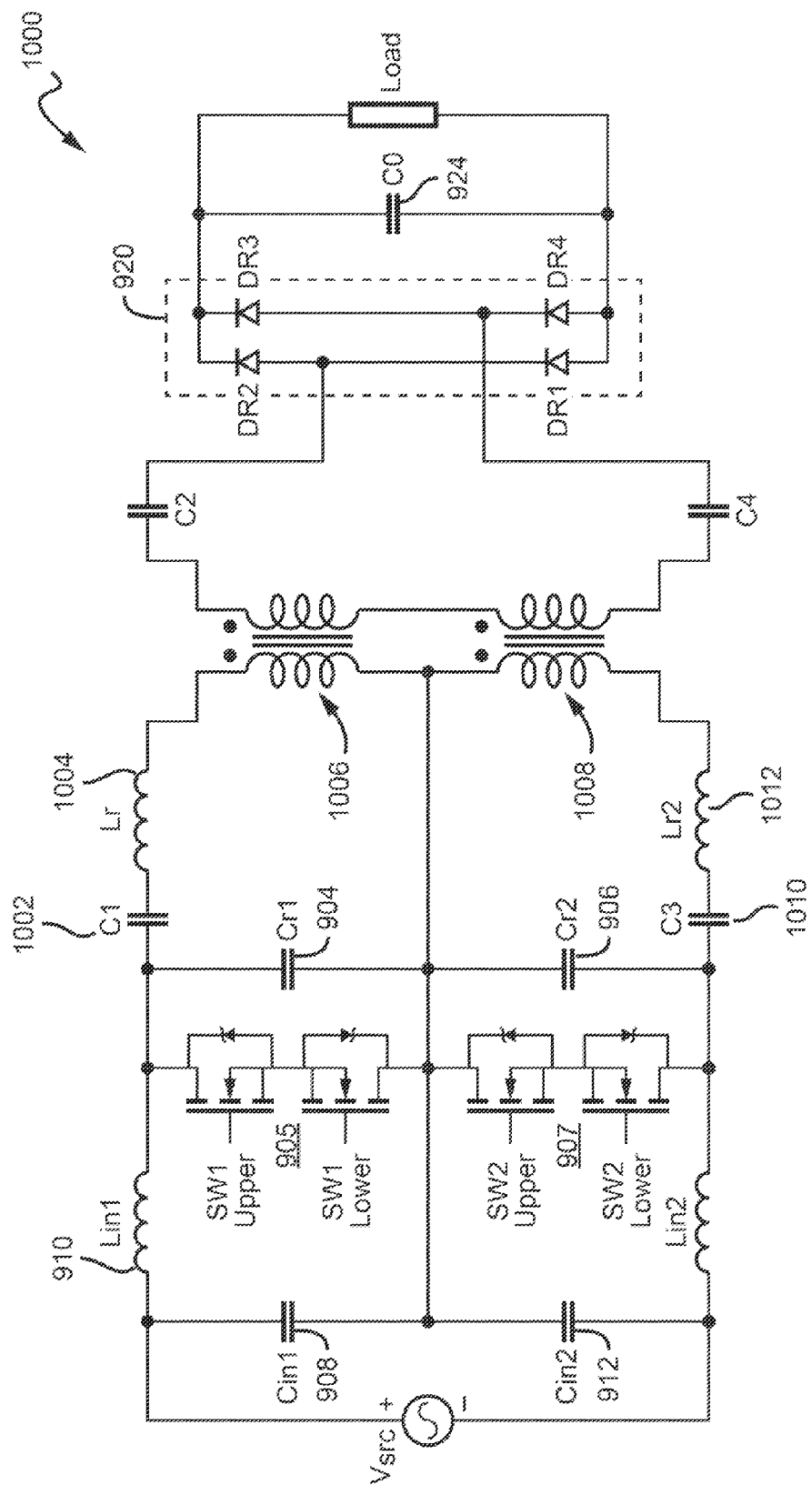
FIG. 10 is a schematic diagram of another embodiment of a resonant isolated active PFC rectifier having two resonant capacitors connected across two switches for enhanced high voltage capability and using two transformers.

FIG. 10 is a schematic diagram illustrating a converter 1000 having the multiple switch, resonant capacitor and full bridge rectifier components illustrated in FIG. 9 to obtain high power switching, but with the addition of a second transformer and associated DC-blocking and resonant inductor components. The first and second switches SW1 and SW2 (905, 907) are connected in series, with the first and second resonant capacitors (Cr1 904, Cr2 906) connected across them, respectively. The input capacitors Cin1 908 and Cin2 912 are connected across the first switch SW1 905 and the second switch 907, respectively. A DC blocking capacitor C1 1002 is connected in series with a resonant inductor 1004 and a first transformer 1006. In this embodiment, a second transformer 1008 is connected in series with the first transformer 1006 (unlike the converter 900 of FIG. 9). A third DC blocking capacitor C3 1010 and second resonant inductor Lr2 1012 are also now connected in series with the second transformer 1002, first transformer 902 and resonant inductor 1004. A second output DC blocking capacitor C4 is connected between the second transformer 1008 and the full bridge rectifier 920.

While various implementations of the application have been described, it will be apparent to those of ordinary skill in the art that many more embodiments and implementations are possible that are within the scope of this invention. As used herein, "connected" may refer to a direct connection as between components or an electrical connection through intervening components.

We claim:

1. A method of driving an isolated converter, comprising:
   opening a first bi-directional switch on an input side of a transformer;
   accepting current into a resonant capacitor connected across the first bi-directional switch to reduce voltage across the first bi-directional switch (SW) in response to the opening of the first bi-directional switch;
   reversing current out of the resonant capacitor; and
   closing the first bi-directional switch as voltage across the first bi-directional switch crosses zero volts.

2. The method of claim 1, further comprising:
   inducing current to flow through a transformer; and
   rectifying alternating current (AC) output from the transformer to create direct current (DC).

3. The method of claim 2, wherein the rectifying AC output to create DC current is accomplished using a full bridge rectifier connected across an output of the transformer.

4. The method of claim 2, wherein current to a load, when the load is present, is supplied entirely by an output capacitor connected across the load when the first bi-direction switch is closed.

5. The method of claim 1, further comprising:
   increasing current in a first input resonant inductor in a first rotational current direction in response to the closing of the first bi-directional switch.

6. The method of claim 5, further comprising:
   increasing current in a second input resonant inductor in a second rotational current direction that is opposite from the first rotational current direction in response to the closing of the first bi-directional switch.

7. The method of claim 1, further comprising:
   opening a second bi-directional switch connected in series with the first bi-directional switch at approximately the same time as the opening of the first bi-directional switch.

8. The method of claim 7, further comprising:
   accepting current into a second resonant capacitor connected across the second bi-directional switch in response to the opening of the second bi-directional switch.

9. The method of claim 7, wherein the closing of the first bi-directional switch is in response to a positive gate voltage applied to the first bi-directional switch.

10. The method of claim 1, further comprising:
    shorting the resonant capacitor in response to closing the first bi-directional switch.

* * * * *